United States Patent [19]
Casey et al.

[11] Patent Number: 5,394,484
[45] Date of Patent: Feb. 28, 1995

[54] IMAGE RECOGNITION APPARATUS

[75] Inventors: Richard G. Casey, Morgan Hill, Calif.; Yohji Nakamura; Kazuharu Toyokawa, both of Yamato, Japan

[73] Assignee: International Business Machines Corporation, Armonk, N.Y.

[21] Appl. No.: 813,239

[22] Filed: Dec. 23, 1991

Related U.S. Application Data

[63] Continuation of Ser. No. 342,403, Apr. 24, 1989, abandoned.

[30] Foreign Application Priority Data

Apr. 28, 1988 [JP] Japan .................. 63-104469

[51] Int. Cl.$^6$ .............................................. G06K 9/62
[52] U.S. Cl. ........................................ 382/37; 382/15
[58] Field of Search ................... 382/37, 38, 14, 15

[56] References Cited

U.S. PATENT DOCUMENTS

| | | | |
|---|---|---|---|
| 2,978,675 | 4/1961 | Highleyman | 382/39 |
| 4,499,596 | 2/1985 | Casey et al. | 382/37 |
| 4,682,365 | 7/1987 | Orita et al. | 382/37 |
| 4,752,890 | 6/1988 | Natarajan | 382/37 |

OTHER PUBLICATIONS

Casey et al., "A Processor-Based OCR System", IBM Journal of Research Development, vol. 27, No. 4, (Jul. 1983), pp. 386-399.
F. M. Wahl, et al., "Block Segmentation and Text Extraction in Mixed Text/Image Documents", Computer Graphics and Image Processing, vol. 20, 1982, pp. 375-390.
R. G. Casey, et al. "Recursive Segmentation and Classification of Composite Character Patterns", 6th International Conf. on Pattern Recognition, Oct. 1982, pp. 1023-1026.
R. G. Casey et al., "Decision Tree Design Using a Probabilistic Model", IEEE Trans. on Information Theory, vol. IT-30, No. 1, Jan. 1984, pp. 93-99.
K. Y. Wong, et al., "Document Analysis System", IEEE 6th International Conf. on Pattern Recognition, Oct. 1982, pp. 496-500.
R. G. Casey et al., "Unsupervised Construction of Decision Networks for Pattern Classification", IEEE 7th International Conf. on Pattern Recognition, Aug. 1984, pp. 1256-1258.
T. Mano et al., "Automatic Font Selection for Character Recognition", IBM Technical Disclosure Bulletin, vol. 30, No. 3, Aug. 1987, pp. 1112-1114.

Primary Examiner—Leo H. Boudreau
Attorney, Agent, or Firm—Baker, Maxham, Jester & Meador

[57] ABSTRACT

Character recognition apparatus capable of automatically modifying its recognition tree is disclosed. When a character is erroneously recognized, its image is used to select a leaf node of the character recognition tree which has a high probability of recognizing the character correctly. The tree is split at that node, creating one new leaf node which is assigned to the character formerly assigned to the split node, and a second new leaf node assigned to the erroneously recognized character. The split node is then assigned to test a pel address in a character image which has a high probability of discriminating between the two characters of its new leaf nodes.

21 Claims, 12 Drawing Sheets

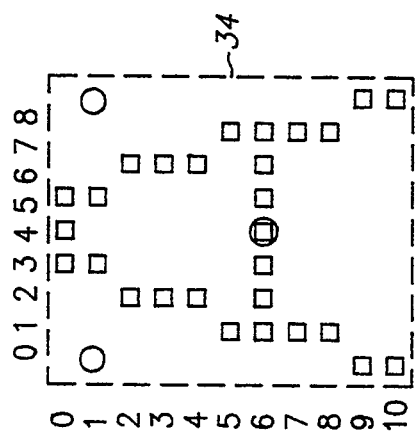
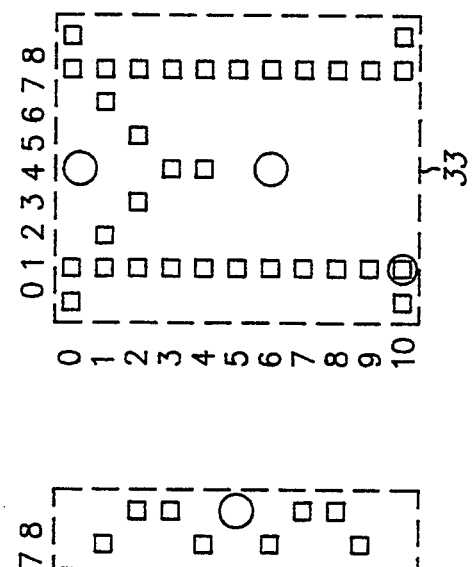
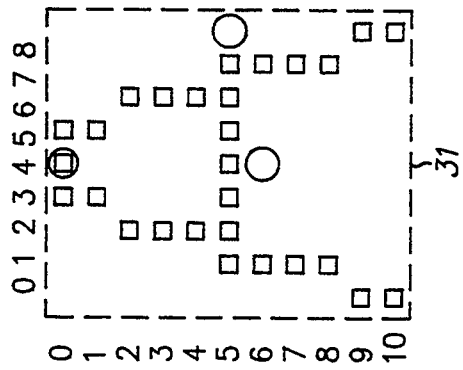
FIG. 3
FIG. 3A 3 x 3 PEL WINDOW

| | | | | | | | | | |
|---|---|---|---|---|---|---|---|---|---|
| X | 0 | 0 | 1 | 1 | 1 | 0 | 0 | 0 | 0 |
| 0 | 0 | 0 | 1 | 0 | 1 | 0 | 0 | 0 | 1 |
| 0 | 0 | 1 | 0 | 0 | 0 | 1 | 0 | 0 | 2 |
| 0 | 0 | 1 | 0 | 0 | 0 | 1 | 0 | 0 | 3 |
| 0 | 0 | 1 | 0 | 0 | 0 | 1 | 0 | 0 | 4 |
| 0 | 0 | 1 | 1 | 1 | 1 | 1 | 0 | 0 | 5 |
| 0 | 1 | 0 | 0 | 0 | 0 | 0 | 1 | 0 | 6 |

| 2 | 3 | 4 |
|---|---|---|
| 1 | X | 5 |
| 8 | 7 | 6 |

*FIG. 5*

|   | 0 | 1 | 2 | 3 | 4 | 5 | 6 | 7 | 8 |
|---|---|---|---|---|---|---|---|---|---|
| 0 | 0 | 0 | 0 | 2 | 95 | 9 | 0 | 0 | 0 |
| 1 | 0 | 0 | 0 | 95 | 100 | 100 | 0 | 0 | 0 |
| 2 | 0 | 0 | 26 | 89 | 24 | 40 | 64 | 0 | 0 |
| 3 | 0 | 0 | 97 | 0 | 0 | 39 | 100 | 0 | 0 |
| 4 | 0 | 0 | 88 | 3 | 1 | 20 | 100 | 0 | 0 |
| 5 | 0 | 0 | 98 | 56 | 48 | 75 | 100 | 2 | 0 |
| 6 | 0 | 1 | 100 | 99 | 70 | 100 | 100 | 11 | 0 |
| 7 | 0 | 15 | 30 | 19 | 16 | 10 | 41 | 54 | 0 |
| 8 | 0 | 90 | 0 | 0 | 0 | 0 | 3 | 95 | 1 |
| 9 | 89 | 100 | 76 | 0 | 0 | 0 | 96 | 100 | 99 |
| 10 | 33 | 68 | 29 | 0 | 0 | 0 | 44 | 57 | 44 |

— AREA 12A OF MAP BUFFER 12

*FIG. 6*

|   | 0 | 1 | 2 | 3 | 4 | 5 | 6 | 7 | 8 |
|---|---|---|---|---|---|---|---|---|---|
| 0 | 0 | 6 | 37 | 59 | 72 | 21 | 0 | 0 | 0 |
| 1 | 3 | 100 | 100 | 98 | 98 | 100 | 38 | 0 | 0 |
| 2 | 0 | 100 | 99 | 2 | 0 | 67 | 100 | 46 | 0 |
| 3 | 0 | 98 | 99 | 0 | 0 | 0 | 100 | 99 | 0 |
| 4 | 0 | 100 | 100 | 3 | 0 | 61 | 100 | 34 | 0 |
| 5 | 0 | 97 | 100 | 66 | 51 | 96 | 100 | 6 | 0 |
| 6 | 0 | 94 | 100 | 97 | 89 | 99 | 100 | 5 | 0 |
| 7 | 0 | 93 | 100 | 0 | 0 | 0 | 2 | 100 | 92 |
| 8 | 0 | 96 | 100 | 0 | 0 | 0 | 14 | 100 | 84 |
| 9 | 58 | 100 | 100 | 100 | 100 | 100 | 95 | 13 | 0 |
| 10 | 9 | 69 | 61 | 73 | 79 | 78 | 27 | 0 | 0 |

— AREA 12B OF MAP BUFFER 12

*FIG. 7*

IMAGE RECOGNITION APPARATUS

This is a continuation of application Ser. No. 07/342,403, filed Apr. 24, 1989, now abandoned.

FIELD OF INVENTION

The invention relates to a pattern recognition apparatus. More particularly, the invention relates to a pattern recognition apparatus which, during the recognition of patterns or images of characters, modifies a recognition procedure due to erroneously recognized patterns or images of characters.

PRIOR ART AND PROBLEMS

Systems have been developed which supply images of printed characters of a document scanned by an image scanning device to a personal computer to perform character recognition by a character recognition algorithm. Since it is desired to recognize the characters at high speed in this system, character recognition trees of the point sampling type are used, wherein particular picture elements (pel) of character images are sequentially sampled and plural nodes are sequentially selected depending upon whether the sampled pel is white or black. A character recognition tree is prepared for each type font. Since it is very difficult to modify the completed character recognition tree to recognize another font, a number of character recognition trees of the type fonts which are expected to be used frequently must be prepared. For example, character recognition trees of thirty kinds of fonts may be stored in a memory. Accordingly, when characters of a font which differs from the fonts of the stored trees in the memory are included in a document, the probability of recognition is remarkably decreased.

R. G. Casey and C. R. Jik, "a processor-based OCR system", IBM Journal of Research Development, Volume 27, No. 4, July. 1983, pp. 386–399, disclose a system which uses three trees as one set and combines the results from each tree.

F. M. Wahl, K. Y. Wong and R. G. Casey, "Segmentation and Text Extraction in Mixed Text/Image Documents", Computer Graphics and Image Processing, Volume 20, 1982, pp. 375–390, disclose a method for automatically discriminating between text regions and non-text regions of printed document.

R. G. Casey and G. Nagy, "Recursive segmentation and classification of composite character patterns", the 6th International Conference on Pattern Recognition, October 1982, disclose the use of a decision tree for effectively segmenting and recognizing characters.

R. G. Casey and G. Nagy, "Decision Tree Design Using a Probabilistic Model", IEEE Transaction on Information Theory, Volume IT30, No. 1, January 1984, pp. 93–99, and R. G. Casey, "Automatic generation of OCR logic from scanned characters", IBM Technical Disclosure Bulletin, Volume 22, No. 3, August 1979, p. 1189, disclose a method for making a mathematic model of a decision tree from a probability of pels.

K. Y. Wong, R G Casey and F. Wahl, "Document Analysis System:", IEEE 6th International Conference on Pattern Recognition, October 1982, disclose an adaptive OCR reading a document by partitioning the document to a text area and a non-text area.

R. G. Casey, S. K. Chai and K. Y. Wong, "Unsupervised construction of decision networks for pattern classification", IEEE 7th International Conference on Pattern Recognition, August 1984, and U.S. Pat. No. 4,499,596 by R. G. Casey and T. D. Friedman, disclose a method for increasing the speed of recognition by determining some pels of a text character before comparing an entire pattern of the character.

Y. Mano, Y Nakamura and K. Toyokawa, "Automatic font selection for character recognition:", IBM Technical Disclosure Bulletin, Volume 30, No. 3, August 1987, pp. 1112–1114, disclose a method for determining which one of plural type fonts is used to print characters of a document.

SUMMARY OF INVENTION

A document scanning device, under the control of pattern or character recognition algorithm or character recognition means, optically scans patterns or images of characters on a document, and generates binary image data 1 or 0 representing the images. For simplifying description, the binary image data of the binary (1 or 0) is called an image of a character or pattern. The image of the patterns or characters of one page of a document is stored in an image buffer under the control of the character recognition algorithm, and respective patterns or images of characters are segmented and stored in a working buffer. The character recognition algorithm recognizes the images stored in the working buffer and stores the results into a resultant buffer. The character recognition algorithm stores character codes of characters recognized with high probability in the resulting buffer, stores character codes and images of characters recognized with low capability and flags indicating the low probability in the resulting buffer, and displays the contents of the resultant buffer on a display screen of a display device. An operator viewing the displayed results of the recognition inputs a correct character code for an erroneously recognized character through a keyboard, to correct the character code of the erroneously recognized characters in the resultant buffer to the correct character code. Further, operations for modifying the trees based upon the results of recognition are started. The character recognition algorithm stores the image of the erroneously recognized character and its correct character code in a learning buffer.

The character recognition algorithm sequentially scans each pel of the character image in the learning buffer by using a scanning window. The size of the window is 3×3 pels, for example. The central pel of the window is positioned at a pel of the character image to be processed. The character recognition algorithm accesses an entry of a statistics table by using a bit pattern of neighboring pels of the central pel as an address. In the accessed entry, a value representing a probability of black appearing in the pel being processed is stored. The character recognition algorithm fetches this value of probability and stores the value in a storage position of a probability map, which corresponds to the position of the central pel. The character recognition algorithm supplies the value of the probability map to the character recognition tree as an input, detects a leaf node generating a high value of probability of recognition, fetches a character image of the character code assigned to this leaf node, and forms the probability map of the character image. Next, the character recognition algorithm compares the values of both the probability maps for each storage position, detects a storage position at which one of the values is high and the other of the values is low, replaces the character code originally assigned to the detected leaf node by the address of the detected storage position, extends two nodes from the leaf node, assigns the originally assigned character code to one of the extended nodes, and assigns the character code in the character image in the learning buffer to the other node. The character recognition algorithm supplies the character code in the resultant buffer to the data processing device and stores the modified character recognition tree in the tree memory. Accordingly, the new tree is used in the subsequent character recognition operations.

DESCRIPTION OF THE DRAWINGS

FIGS. 3 and 3A show the character images.

FIG. 4 shows the operations for scanning the character image by using the window.

FIG. 5 shows the addresses of the window.

FIGS. 6 and 7 show the two areas of the map buffer storing the probability values of each pel position of the character images A and B.

DESCRIPTION OF THE PREFERRED EMBODIMENT

In the description which follows, the terms "pattern" and "character" appear. In this regard, a pattern is a shape, form, or outline which can be recognized. A character is a pattern which represents data or information.

Figure 1:
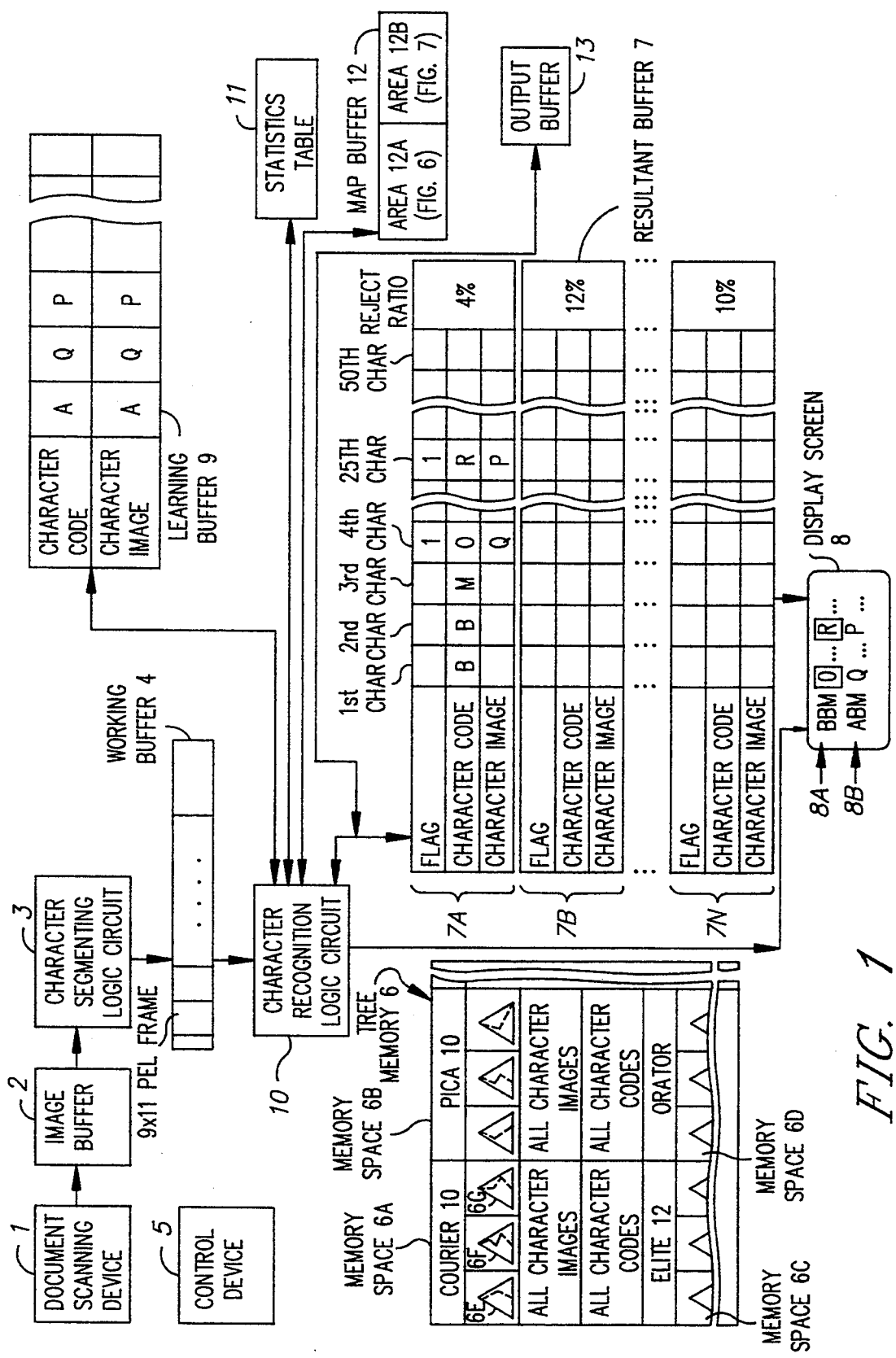
FIG. 1 shows a block diagram of the character recognition apparatus of the present invention.

Referring to FIGS. 1 and 2, FIG. 1 shows a circuit block diagram for modifying the trees by the learning function, in accordance with the present invention, and FIGS. 2A through 2E show flowcharts representing the operations of the circuit block.

A document scanning device 1 is a well-known device which includes a document feed mechanism, a light source, a lens, plural optical sensing elements arranged in a line and a threshold circuit. The number of the optical sensing elements is 8 elements/mm, for example. That is, the pel density in the main scan direction is 200 pels/inch, and the pel density in the sub-scan direction perpendicular to the main scan direction is also 200 pels/inch, for example. One optical element generates an analog signal of one pel, and this analog signal is applied to the threshold circuit. A binary "1" signal representing a black pel is generated when the analog signal is lower than a predetermined threshold value, and a binary "0" signal representing a white pel is generated when the analog signal is higher than the threshold. These operations are performed by blocks 21 and 22 in FIG. 2A.

The document includes plural character rows, and one character row includes about 50 printed alphanumeric characters. The reading operations of the documents are performed for each row, and the character images of one paper document are stored in the image buffer 2. This operation is performed by a block 23 in FIG. 2A.

The character segmenting logic circuit 3 is a well-known circuit which scans the image buffer to find a rectangle which contacts the outer edges of each character in the first row in order to segment each character in the first row. All the characters in one row are segmented and stored in frames of $9 \times 11$ pels of the working buffer 4, with the center of the character image being positioned at the center of the frame of $9 \times 11$ pels. These operations are performed by the blocks 24 and 25 of the FIG. 2A. The control device 5, such as the microprocessor, controls the above operations.

Before describing the next operations, the type fonts of the characters and the tree memory 6 are described. The characters of the document are printed by various type fonts. The type fonts are classified into 10 pitch group, 12 pitch group, letter Gothic group, orator group and proportional group. The 10 pitch group includes the type fonts of Courier 10, Pica 10, Prestige Pica 10 and Titan 10. The 12 pitch group includes the type fonts of Courier 12, Elite 12, Prestige Elite 12 and OCR B12. The letter Gothic group includes the type fonts of Orator and Presenter, and the proportional group includes the type fonts of Bold, Cubic/Triad, Roman and Title. The tree memory 6 stores the character recognition trees, the character images and the character codes for each type font.

Referring to FIG. 1, the tree memory 6 is divided into 18 memory spaces. One type font is assigned to one memory space. In FIG. 1, only four memory spaces 6A, 6B, 6C and 6D are shown. The memory space 6A stores one set of three character recognition trees 6E, 6F and 6G, all character images, and all character codes of the type font "Courier 10". In the same manner, the memory spaces 6B, 6C and 6D store the character recognition trees, all character images, and all character codes of the Pica 10, Elite 12 and Orator.

Figure 2A:
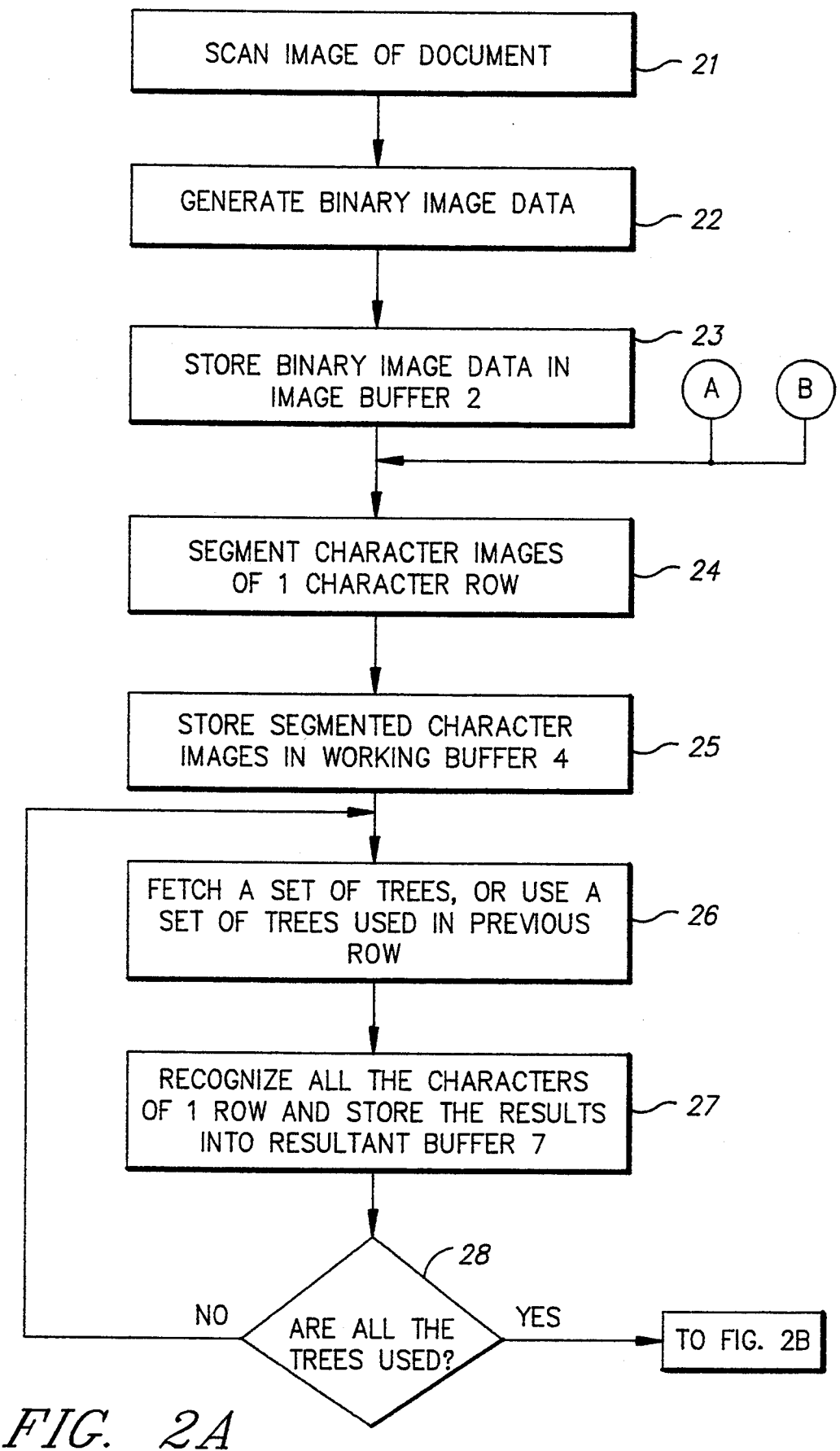
FIGS. 2A, 2B, 2C, 2D and 2E are flowcharts showing the recognition steps and the tree modifying steps of the character recognition method of the present invention.

After the operations of block 25 in FIG. 2A, the control circuit 5 starts the operations of the character recognition logic circuit 10. The circuit 10 in block 26 fetches one set of the character recognition trees and all character codes from any one of the memory spaces. For example, it is assumed that the character recognition trees 6E, 6F and 6G and all character codes for the Courier 10 font in memory space 6A have been fetched.

The operations proceed to block 27, and the character recognition logic circuit 10 accesses the first frame of the working buffer 4 to fetch the first character image of the first character row, recognizes the first character image by using the first character recognition tree 6E, and stores the results in an auxiliary buffer (not shown). Next, the character recognition logic circuit 10 recognizes the first character image again by using the second character recognition tree 6F and stores the results in the auxiliary buffer. Next, the character recognition logic circuit 10 recognizes the first character image again by using the third character recognition tree 6G, and stores the results in the auxiliary buffer.

Finally, the character recognition logic circuit determines the three results stored in the auxiliary buffer, and generates a final result depending upon the three results, as shown below.

Case 1: store the character code in the resultant buffer 7 when the degree of accuracy is higher than a predetermined value.

Case 2: store the character code which is the result of the recognition and the image of this character in the resultant buffer and set flag to 1, when the degree of accuracy is lower than the value. The flag 1 represents that this character is a rejected character.

Figure 3D:
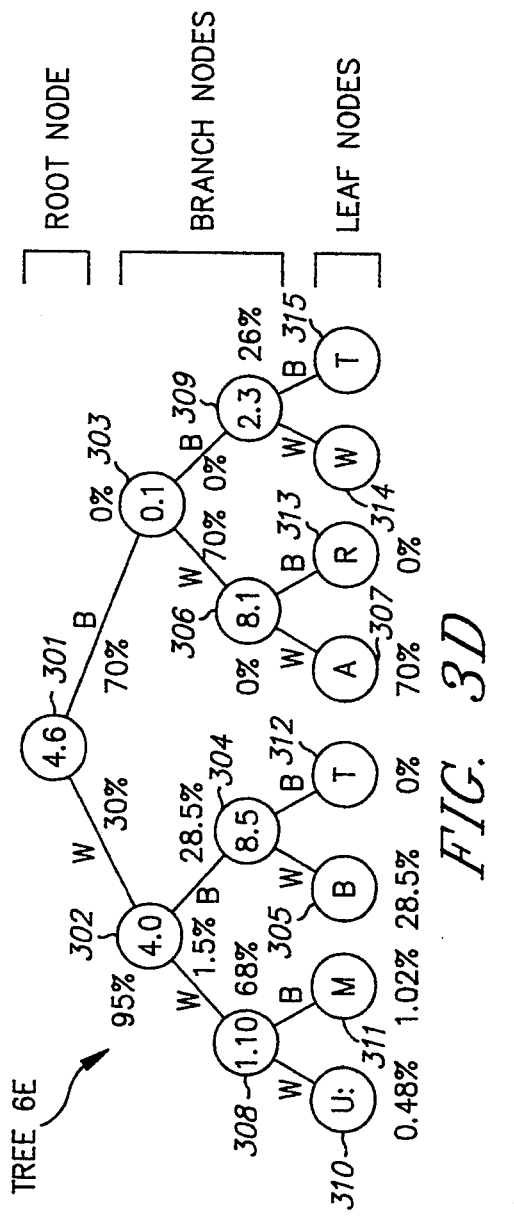
FIG. 3D shows the operations for inputting the probability values in the map buffer to the tree shown in the FIG. 3B.
Figure 3E:
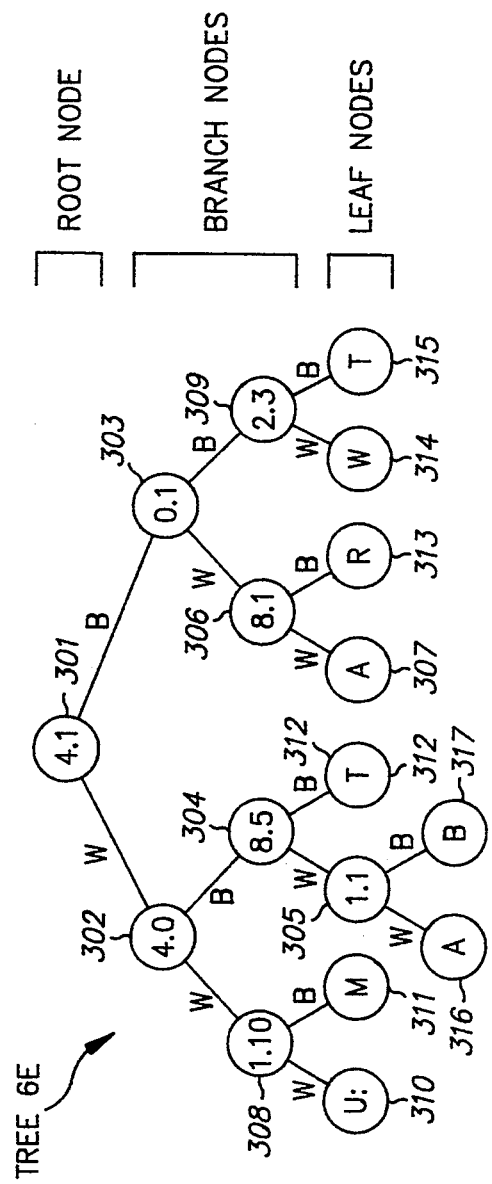
FIG. 3E shows the operations for extending the one leaf node of the tree.
Figure 3B:
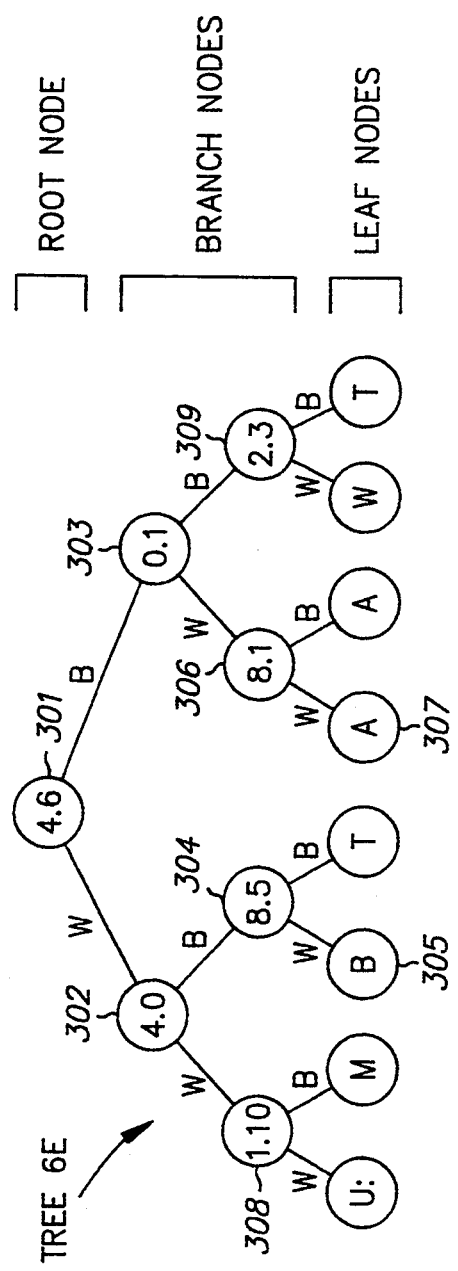
FIG. 3B shows the character recognition tree.
Figure 3C:
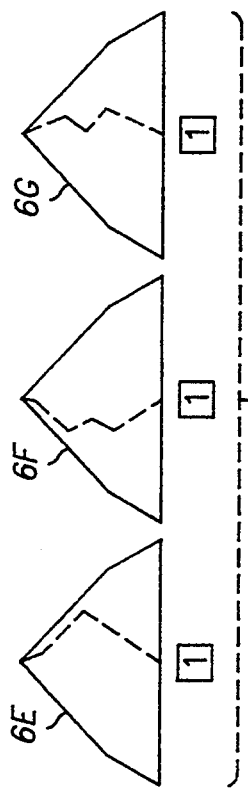
FIG. 3C shows one set of trees stored in a memory space of the tree memory.

The above recognition operations of the character image are described with referring to FIGS. 3A, 3B and 3C. It is assumed that the second and third characters "B" and "M" are typed in the Courier 10 font, and the first character "A" is typed in a different type font. The images 31–33 of these characters have been stored in the three frames of the working buffer 4.

FIG. 3B shows the simplified tree 6E for the Courier 10 font in the memory space 6A shown in FIG. 1. The character recognition tree determines or discriminates as to whether a pel at a predetermined pel position is white or black, selects the succeeding pels depending upon whether the previous pel was black or white, and generates the final result. That is, the tree 6E selects a pel address (4, 6) of the image 31 in the frame in the first root node 301, determines as to whether the pel at this address is black or white, and proceeds to the next branch node 302 or 303 depending upon the result of the node 301.

In the exemplary case the answer to the root node 301 is white, selecting the branch node 302 at which the pel at address (4, 0) is selected. This pel is determined to be white or black, and since the answer is black the next branch node 304 is selected. The pel at address (8, 5) is determined to be white or black, and since the answer is white operations proceed to leaf node 305 and the resulting recognition of "B" is obtained. That is, although the first character 31 is A, the character recognition tree 6E has recognized this first character as B. If the type font of this first character were the type font of the Courier 10, as shown by the reference number 34 in the FIG. 3, the tree 6E must trace from the node 301 through nodes 303 and 306 to node 307 to generate the answer A. Since the actual results of the recognition is B, the character recognition logic circuit 10 stores the character code of the character B and the degree of accuracy of the recognition into the auxiliary buffer (not shown).

Next, the character recognition logic circuit 10 recognizes the first character as A by using the tree 6F, stores the results in the auxiliary buffer, recognizes the first character as A again by using the tree 6G, stores the results in the auxiliary buffer, and generates the final result based upon the these three results. The recognition of the characters by using three kinds of trees is described in the first article cited above.

It is assumed that the final result of the recognition of the first character is B. The character recognition logic circuit 10 stores the character code of the character B in the first character position in an area 7A of the resultant buffer 7.

In the same manner as described above, the character recognition logic circuit 10 fetches the second character image B from the working buffer 4, recognizes the image by using the three trees 6E, 6F and 6G to generate the final result, and stores the final result into the second character position in the area 7A of the resultant buffer 7.

In this manner all the characters, e.g. fifty characters, in the first character row are recognized and the final results of all the characters are stored in the area 7A of the resultant buffer 7. Although the character recognition tree 6E shown in FIG. 3B is shown in a simplified form, the tree actually includes 10-11 decision steps. When the total nodes is 2999, the number of the leaf nodes is about 1500.

It is assumed that although the fourth printed character in the first character row of the document is actually Q, the final result of the recognition is O and its degree of accuracy is low, and that although the 25th printed character in the first character row of the document is actually P, the final result of the recognition is R and its degree of accuracy is low. In this case, the character recognition logic circuit 10 sets flag 1 and stores the character code of the character O and the actual image of the printed character Q in the fourth character position in the area 7A of the resultant buffer 7, and also sets flag 1 and stores the character code of the character R and the actual image of the printed character P in the 25th character position in the area 7A of the resultant buffer 7, as shown in FIG. 1. The character recognition logic circuit 10 calculates a reject ratio based upon the number of flags in the area 7A and stores it. In the exemplary case, since two flags 1 of the two characters among the total 50 characters are set, the reject ratio is 4% and this 4% is stored.

Next, in block 28 it is determined whether all fonts, i.e., 18 kinds of fonts in the exemplary case, have been used or not in the recognition operations. If the answer is NO, the operations return to block 26 in which the memory space of the next font in the tree memory 6 is accessed, and the operations described above are performed. Block 28 generates the answer YES when the character code and the character image have been stored in the learning buffer 9 during the process of the character row.

When the recognition operations of the first character row using all the kinds of recognition trees for the eighteen type fonts has been completed, the answer from block 28 is YES and the results of the recognition have been stored in the eighteen areas 7A, 7B, . . . 7N of the resultant buffer 7. For simplifying, FIG. 1 shows only the reject ratio in each area 7B, 7N.

Figure 2B:
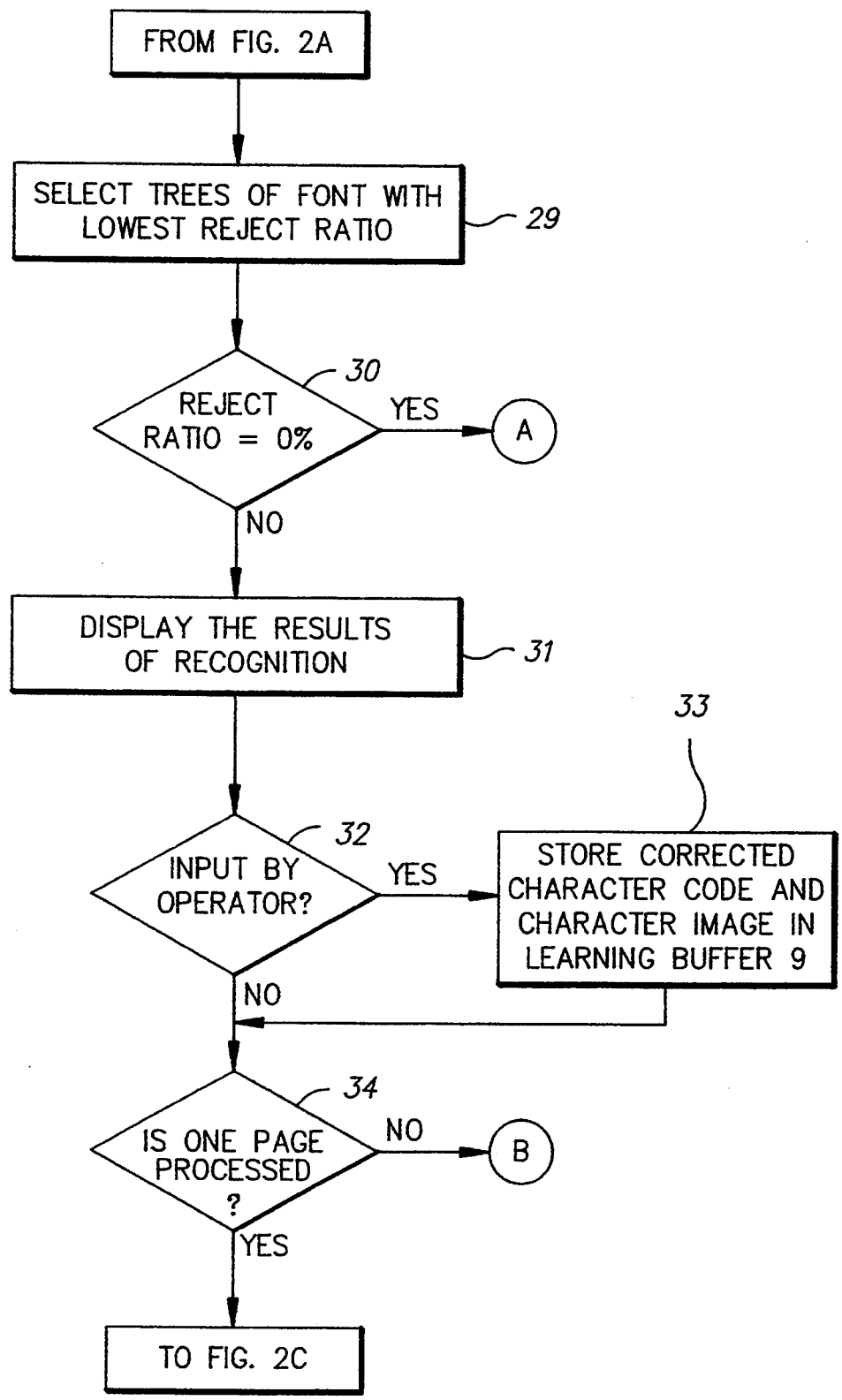

Next, the operations proceed to block 29 in FIG. 2B. The character recognition logic circuit 10 determines the reject ratio of each area 7A, . . . , 7N of the resultant buffer 7, selects the type font of the lowest reject ratio, and uses the trees of the selected font in the subsequent processes. It is assumed that the reject ratio of the Courier 10 in the area 7A is lowest.

Next in block 30 of FIG. 2B, the character recognition logic circuit 10 determines whether the reject ratio 4% of the Courier 10 is equal to 0%. Since the answer is NO, the operations proceed to block 31. If the answer of block 30 is YES, the operations return to block 24 of FIG. 2A, and the operations for processing the next character row are started.

In block 31, the character codes of the first character row stored in area 7A of the resultant buffer 7 are supplied to a character generator circuit (not shown). The character images from the character generator circuit are displayed on the display area 8A of the display screen 8, with the 4th and 25th characters (with the flag 1 set) displayed using blinking or highlighting. All the character images of the first character row stored in the working buffer 4 are displayed on display area 8B of the display screen 8. Accordingly, the operator can compare the actual character images of the document displayed on the display area 8B with the recognition results displayed on the display area 8A of the display screen 8. The operator corrects the character code B of the first character in the area 7A of the resultant buffer 7 to the character code A by positioning a cursor at the first character and inputting the character code of the character A from a keyboard (not shown). The operator corrects the character code O of the 4th character in area 7A to the character code Q by positioning the cursor at the 4th character and inputting the character code Q. The operator corrects the character code R of the 25th character in the area 7A to the character code P by positioning the cursor at the 25th character and inputting the character code P. With this step the corrected character codes of all the characters of the first character row have been stored in resultant buffer 7. Block 32 in FIG. 2B determines whether the input operations by the operator are performed, and if the answer is YES, the operations proceed to block 33.

In block 33, the corrected character code A in the first character in area 7A of the resultant buffer 7, and the image A of the first character in the working buffer 4, are stored in the first position of the learning buffer 9, as shown. The corrected character code Q of the 4th character in area 7A and the character image Q are stored in the next position of the learning buffer 9, and the corrected character code P of the 25th character in area 7A and the character image P are stored in the third position of the learning buffer 9. Thus, for each completion of the recognition of one character row the algorithm determines whether the correction by the operator has been made, and if made, stores the contents into the learning buffer 9.

If the newly corrected character is the same as the character already stored in the learning buffer 9, this new character is not stored in the buffer 9. Whenever the correction of the character codes of one character row in the resultant buffer 7 has been completed, the character codes including the corrected character codes in one character row are stored in an output buffer 13. When the operations of block 33 have been completed, the operations proceed to block 34.

In block 33, after the character code and the character image have been stored in the learning buffer 9, the trees used for the first character row are used in the recognition of the succeeding character rows. That is, a new set of trees are not used when the answer to block 34 is NO— operation returns to block 24 and proceeds to block 26 through block 25. In this case, block 26 uses the set of trees used in the first character row rather than a new set of trees, and block 28 generates the output YES.

Block 34 determines whether all the character rows of one page of the document have been processed. If NO, operation returns to block 24 in FIG. 2A to process the remaining character rows. If YES, operation proceeds to block 35 in FIG. 2C.

In block 35, the character recognition logic circuit 10 fetches the character code A and the character image A from the first position of the learning buffer 9, and performs the operations of block 36.

Before describing the operations of block 36, the 3×3 pel window 41 shown in FIG. 4, the statistics table 11 shown in FIG. 1, and the map buffer 12 shown in FIG. 1 are described.

Eight peripheral pels of the 3×3 pel window 41 are assigned pel addresses as shown in FIG. 5. The 3×3 pel window 41 is so positioned that the central pel X is positioned at the upper-left corner pel of the character image, as shown in FIG. 4. The statistics table 11 stores a value representing a probability of black appearing in the central pel X or the current pel being processed, as shown in Table 1 (below). The bit in pel address 1 of the 3×3 pel window 41 represents the most significant bit (MSB) and the bit in pel address 8 represents the least significant bit (LSB). The map buffer 12 includes an area 12A and an area 12B. The size of each area 12A, 12B is the same as the size of the frame in the working buffer 4 of FIG. 1, i.e. 9×11 pel. That is, the size of each area 12A, 12B is the same as the size of each of the images 31, 32 and 33 shown in FIG. 3A.

Describing the operations of block 36, the character recognition logic circuit 10 positions the current pel X of the 3×3 pel window 41 at the upper left pel of the image 31 of the character A, as shown in FIG. 4. It is noted that the pattern of the binary 1's and 0's in FIG. 4 represents the image 31 shown in FIG. 3A. The values of addresses 1, 2, 3, 4 and 8 of the 3×3 pel window 41 which are located outside of the image 31 are binary 0. In this case, the addresses 1–8 of the window are the binary values 00000000. The character recognition logic circuit 10 accesses the statistics table 11 by using the above binary values as an address. A sample statistics table is shown in Table 1.

TABLE 1

| | (STATISTICS TABLE 11) | |
|---|---|---|
| ENTRY | ADDRESS | PROBABILITY OF BLACK (%) |
| 0 | 00000000 | 0 |
| 1 | 00000001 | 0 |
| 2 | 00000010 | 7 |
| 3 | 00000011 | 3 |
| . | . | |
| 10 | 00001010 | 2 |
| . | . | |
| 18 | 00010010 | 26 |
| . | . | |
| 38 | 00100110 | 88 |
| . | . | |
| 41 | 00101001 | 98 |
| . | . | |
| 44 | 00101100 | 40 |
| . | . | |
| 49 | 00110001 | 95 |
| . | . | |
| 100 | 01100100 | 100 |
| . | . | |
| 129 | 10000001 | 0 |
| 130 | 10000010 | 9 |
| . | . | |
| 141 | 10001101 | 95 |
| . | . | |
| 199 | 11000111 | 3 |
| . | . | |
| 248 | 11111000 | 100 |
| . | . | |
| 255 | 11111111 | 100 |

As described hereinbefore, when the current pel X of the 3×3 pel window 41 is positioned at the upper left pel (0, 0) of the character image 31 in FIG. 4, the peripheral pels of the current pel X, i.e. the pels of pel addresses 1–8 (FIG. 5), are "00000000". The character recognition logic circuit 10 accesses the entry 0 of the statistics table 11 by using the bit pattern 00000000 as the address, reads out the value of probability, 0 (%), and stores the value 0 (%) in the upper left position (0, 0) of the area 12A of the map buffer 12, as shown in FIG. 6.

Next, the character recognition logic circuit 10 moves the window 41 on the image 31 of FIG. 4 one pel position to the right, to pel address (1, 0). Here again, the bit pattern of the addresses 1–8 of the window 41 is 00000000. The character recognition logic circuit 10 accesses the statistics table 11 by using the bit pattern as the address, and writes the value of probability, 0 (%) into the pel address (1, 0) of the area 12A.

In this manner, the character recognition logic circuit 10 sequentially shifts the window 41 in the rightward direction, and sequentially writes the values of the probability of black's appearance to area 12A of the map buffer 12. After completing the first pel row, the character recognition logic circuit 10 positions the current pel X of the window 41 at the first pel (0, 1) of the second pel row, and processes the pels of the second pel row. In this manner all the pel rows are processed. FIG. 6 shows the values of probability of black appearing in each pel position of the image 31 of the character A.

For example, when the current pel X of the window 41 is positioned at pel position (4, 0) of FIG. 4, the bit pattern of the peripheral pels is 10001101, and entry 141 of the statistics table 11 is accessed. The value of probability, 95 (%) is written in the pel position (4, 0) of area 12A of FIG. 6. When the current pel X of the window 41 is positioned at the pel position (2, 2) of FIG. 4, the bit pattern of the peripheral pels is 00010010, the entry 18 of the statistics table 11 is accessed, and the value of probability, 26 (%), is written into the pel address (2, 2) of area 12A of FIG. 6.

Figure 2C:
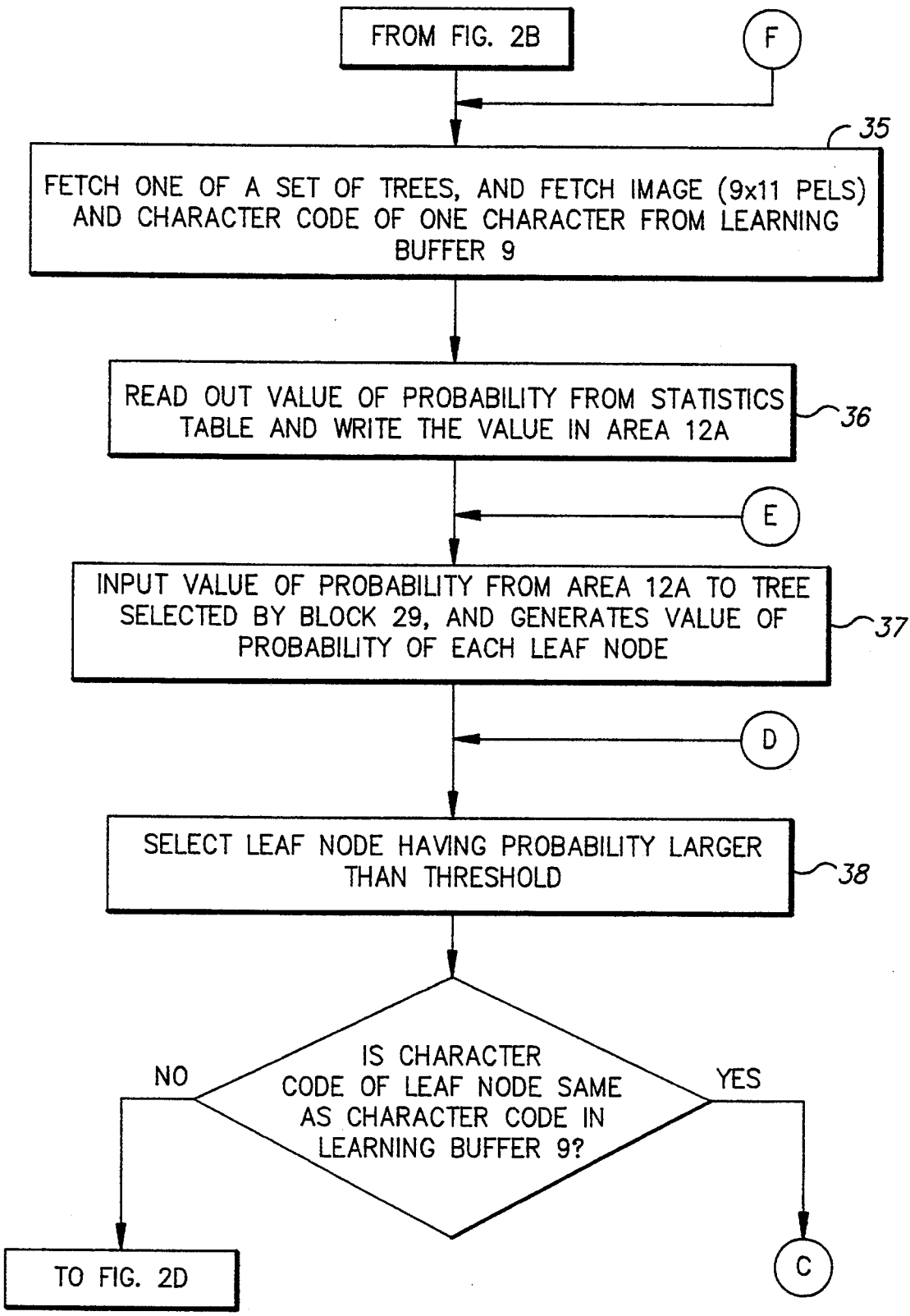

Next, the operations proceed to block 37 in FIG. 2C, and the character recognition logic circuit 10 supplies the probability values of region 12A to each of the character recognition trees selected in block 29 of FIG. 2B, i.e., the three trees 6E, 6F and 6G for the Courier 10 font. Describing the operations for the tree 6E shown in FIG. 3B, the root node 301 of the tree selects pel position (4, 0). Accordingly, the probability value, 70 (%), in position (4, 0) of area 12A in FIG. 6 is fetched. This value 70% represents that, when the image of the character A shown in FIG. 3A is printed one hundred times on different positions on a paper, the pel position (4, 6) of seventy of those characters, i.e., 70% of the 100 characters is printed as black, and the pel position (4, 6) of the other thirty of the characters, i.e., 30% of the 100 characters, is white.

The operations performed when this value is inputted to tree 6E is described with reference to FIG. 3D. From the above description, the probability of a white output from the root node 301 is 30%, and the probability of a black output from the root node 301 is 70%.

Next, the same operations are performed at branch nodes 302 and 303. In branch node 302, the probability value 95% of the position (4, 0) is used. Accordingly, the probability of a white output from node 302 is 30%×5%=1.5%, and the probability of a black output is 30%×95%=28.5%. Next, in the branch node 308 the 68% probability of black appearing at pel position (1, 10) of the area 12A is used. The probability of a black output from branch node 308 is therefore 1.5%×68%=1.02%, and this value is the probability value of leaf node 311. The probability of a white output from branch node 308 is 1.5%×32%=0.48%, and this is the probability value of leaf node 310.

In branch node 304, the probability value, 0%, of position (8, 5) in area 12A is fetched. The probability of a black output from the branch node is 28.5%×0%=0%, and this value is the probability of leaf node 312. The probability of a white output from branch node 304 is 28.5%×100%=28.5%, and this value is the probability of leaf node 305. The same operations are performed at branch nodes 303, 306 and 309 and leaf nodes 307 and 313, and the probability values shown in FIG. 3D are generated. It is noted that the probability supplied to the branch node 309 is 0%. If the probability supplied to a branch node is 0%, the probability value of both the white and black outputs of this branch node is 0%, and the operations are terminated at that branch node.

Next, operations proceed to block 38 in FIG. 2C. The character recognition logic circuit 10 compares the probability value of each leaf node with a predetermined threshold value, for example 2%, selects the leaf nodes having probability values higher than the threshold value, and selects one of the selected leaf nodes. In the exemplary case, only two leaf nodes 305 and 307 are selected, and the leaf node 305 is selected initially. Although only two leaf nodes are selected in the exemplary case, the number of leaf nodes having probability values higher than the threshold value will be in the range of 10–20, since the actual tree has about 1500 leaf nodes.

Next, operations proceed to block 39. The character recognition logic circuit 10 determines whether the character code A in the learning buffer 9 being processed is the same as the character code B of the leaf node 305, or not. Since the answer is NO, the operations proceed to block 40 of FIG. 2D. If the answer is YES, the operations proceed to block 44 without further processing the leaf nodes.

In block 40, the character recognition logic circuit 10 fetches the character image of the leaf node 305 from the tree memory 6. In the exemplary case, the image of the character B of leaf node 305 is fetched from memory space 6A of the tree memory 6. At block 41 the character recognition logic circuit 10 calculates the probability values of black's appearance for all the pels of the character image B fetched in block 40, and writes the values to area 12B of the map buffer 12.

The operations of block 41 are substantially the same as that of block 36. That is, the character image of the character B is scanned using the 3×3 pel window 41. By using the bit pattern of the pel addresses 1–8 of the window 41 as the address the statistics table 11 is accessed, and the probability value of black appearing in the current pel X is sequentially written in area 12B of the map buffer 12. FIG. 7 shows the probability values of black for each pel position of the character B written into area 12B in the manner described above.

Figure 2D:
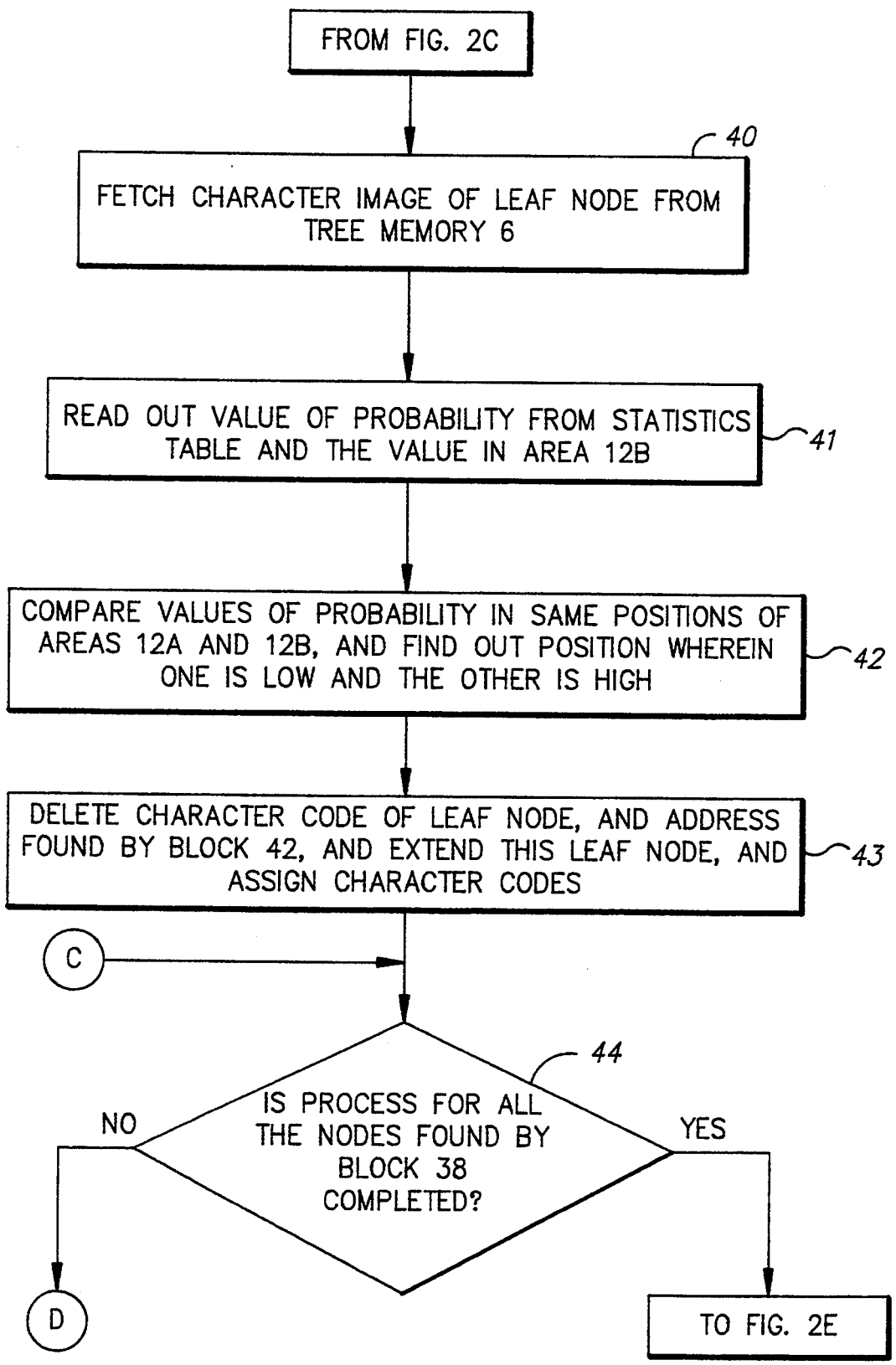

In block 42 of FIG. 2D the character recognition logic circuit 10 sequentially compares the probability values stored in the same pel positions in areas 12A and 12B of the map buffer 12 for the pel position (0, 0), and finds out a pel position at which the value in one of the areas 12A and 12B is low and the value in the other of the areas 12A and 12B is high. That is, the pel position at which a difference in values between areas 12A and 12B is maximum is detected. In the exemplary case, the character recognition logic circuit 10 detects that, at pel position (1, 1), the probability value of area 12A is 0%, while the probability value of area 12B is 100%.

At block 43 the character recognition logic circuit 10 deletes the original character code of the leaf node 305 selected by the block 38, writes the address (1, 1) found by block 42 into the leaf node 305, and extends two nodes 316 and 317 from the leaf node 305, as shown in FIG. 3E. The character recognition logic circuit 10 writes the code of the character, i.e. the character B, having the higher probability at position (1, 1) as shown in FIGS. 6 and 7 into the extended node 317 connected to the black output of leaf node 305, and writes the code of the character, i.e., the character A, having the lower probability at position (1, 1) into the extended node 316 connected to the white output of leaf node 305.

Next, operations proceed to block 44, and the character recognition logic circuit 10 determines whether the processing of all the nodes found by block 38 have been completed. In the exemplary case, since the processing of node 307 has not been completed, the answer of the block 44 is NO and operations return to block 38. In block 38 the character recognition logic circuit 10 selects the unprocessed leaf node 307 and in block 39 determines whether the character code of the character A of the leaf node 307 is the same as the character code of the character A in the learning buffer 9. Since the answer to block 39 is YES, operations proceed to block 44 in FIG. 2D, and detect that the processing of all the leaf nodes 305 and 307 has been completed. Operations then proceed to block 45 in FIG. 2E, where the circuit 10 determines whether all the trees 6E, 6F and 6G have been processed. In the exemplary case, since the trees 6F and 6G have not been processed yet, the operations return to the block 37.

Figure 2E:
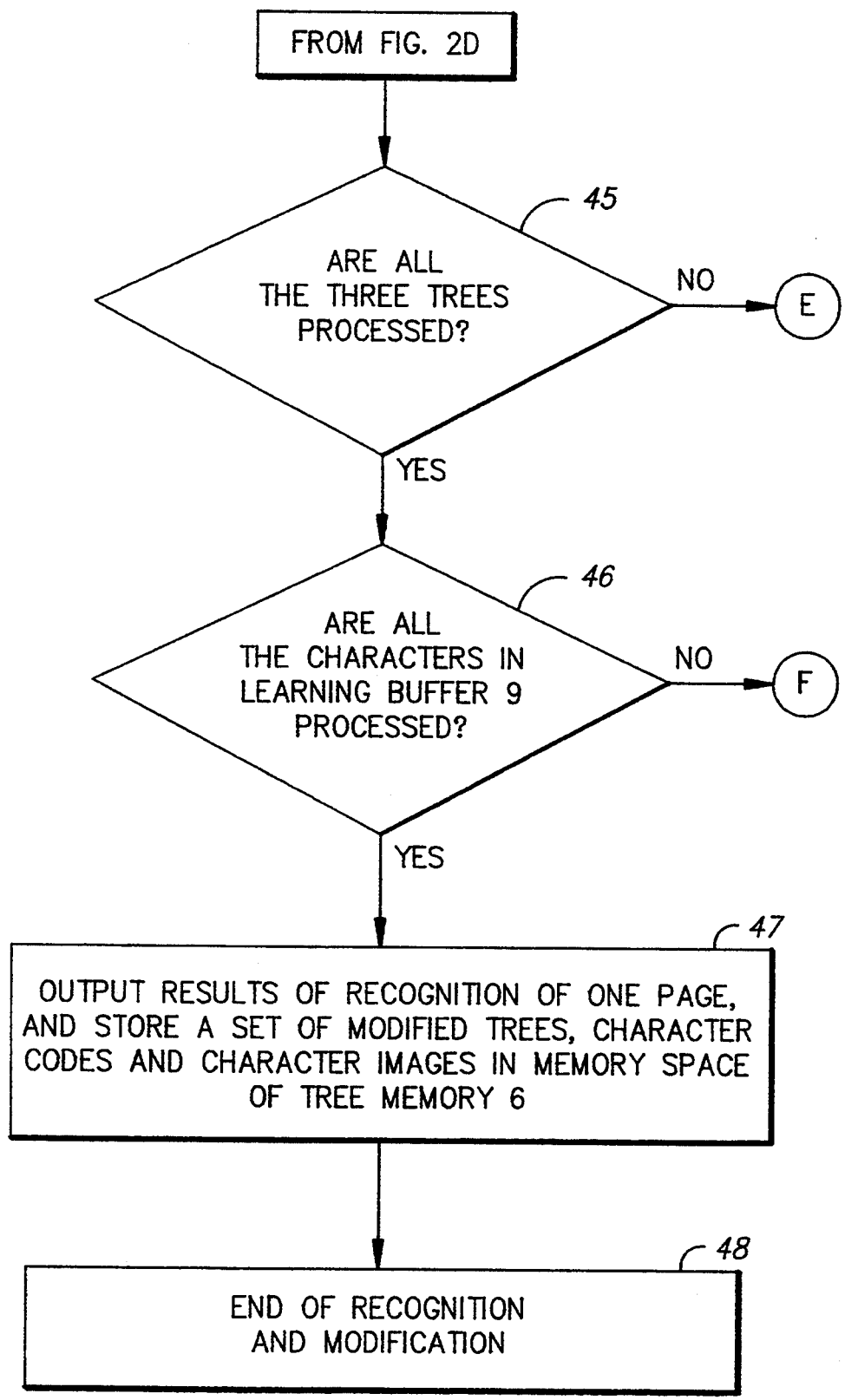

When the modification of all the trees has been completed, the answer to block 45 is YES and operations proceed to block 46 in FIG. 2E. In block 46, the character recognition logic circuit 10 determines whether all the characters in the learning buffer 9 have been processed, that is, whether all the characters to be corrected which were found on one page of the document have been processed. If the answer of block 46 is NO operations return to block 35, while if the answer is YES operations proceed to block 47.

In block 47, the character recognition logic circuit 10 outputs the results of the recognition of one page of the document, i.e. all the character codes stored in the output buffer 13, stores the one set of modified trees, all the character codes and all the character image in an unused memory space, and terminates the character recognition and tree modification operations at block 48.

Figure 8:
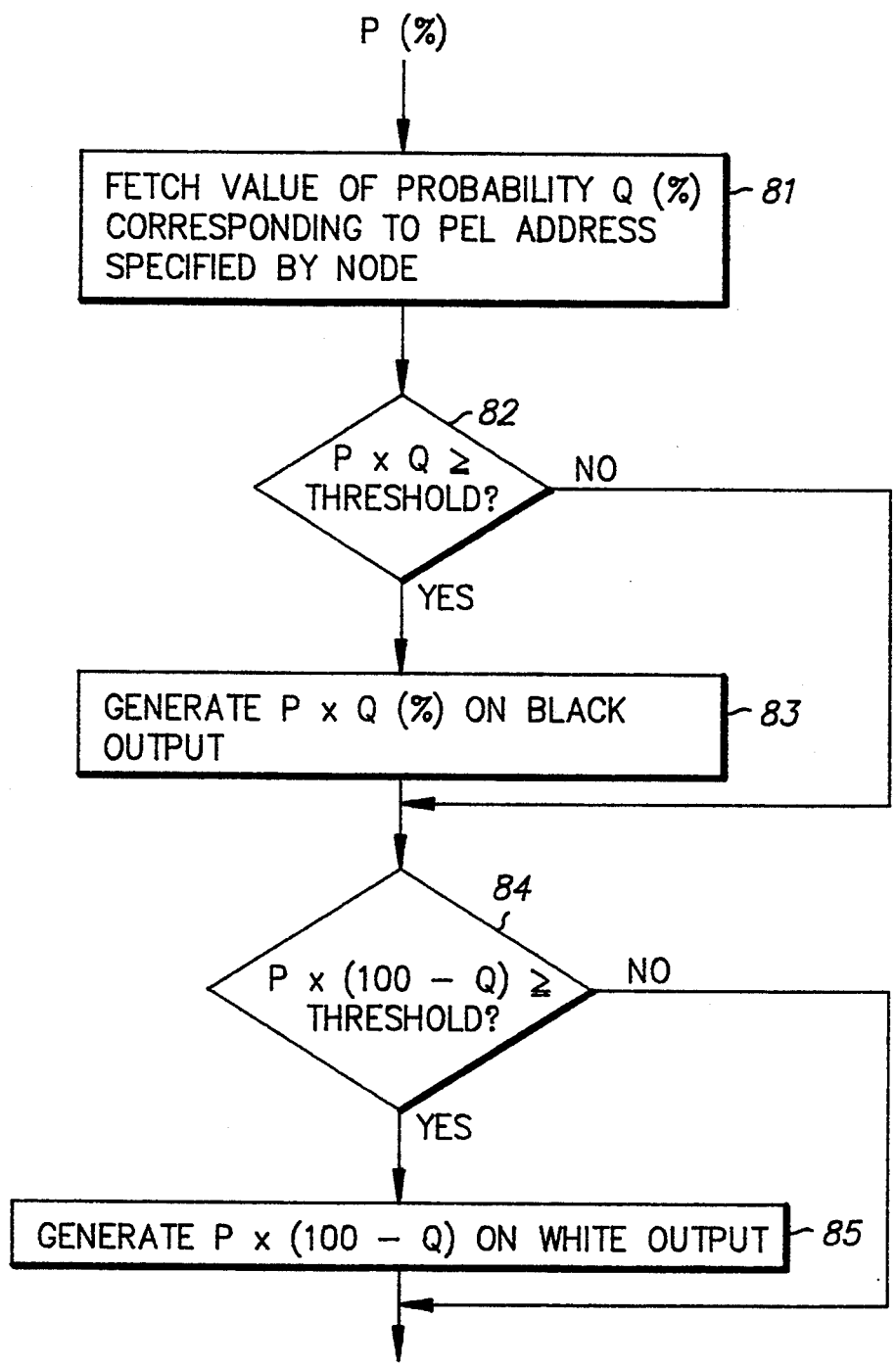
FIG. 8 shows a flowchart of the operations of the nodes of the tree.

FIG. 8 shows the operations of the nodes in FIGS. 3B, 3D and 3E. The operations for supplying the probability values in the map buffer 12 to the branch node 302 of the tree 6E are described. Since the probability value inputted to the branch node 302 is 30%, the input value of probability to block 81 in the FIG. 8 is 30%. In block 81, the probability value Q, i.e. 95%, at pel address (4, 0) of area 12A is fetched. Next, in block 82, the value of $P \times Q$, i.e., $30 \times 95\% = 28.5\%$, is calculated and this calculated value is compared with the threshold value, i.e., 1%. In this case, the answer to block 82 is YES, and node 302 in block 83 generates $P \times Q = 28.5\%$ on the black output, as shown in FIG. 3D. Next, in block 84, $P \times (100 - Q)$, i.e., $30 \times (100 - 95) = 1.5\%$, is compared with the threshold value 1%. In this case, since the answer to block 84 is YES, 1.5% is generated on the white output of branch node 302.

Next, the operations for recognizing a character image stored in the working buffer 4 and having each pel represented by the binary 1, i.e., black 100%, or the binary 0, i.e., black 0%, are described.

It is assumed that the node is connected to the black output of the preceding node, the probability inputted to this node is 100%. The value of probability Q in block 81 at the character recognition is 100% or 0%. Assuming that the value of probability Q is 100%, $P \times Q$ in block 82 is 100%, and in block 83 100% is generated on the black node of this node. Since the answer to block 84 is NO, the white output of this node generates no output.

Block 43 in FIG. 2D performs the following additional operations. After assigning the codes of the characters A and B to the extended leaf nodes 316 and 317, respectively, the probability values of recognition of the characters A and B are stored in these nodes. These values are calculated in the following manner.

It is assumed that, before the modification, the node 305 has a 40% probability of recognition for the character B. The probability values of recognition of the extended final leaf nodes 316 and 317 are decided by the probability of recognition, 40%, the probability 28.5% inputted to the node 305, and the probabilities in the addresses (1, 1) of areas 12A and 12B of map buffer 12 specified by node 305.

The probability of recognition of node 316 is calculated in the following manner. The probability of black appearing in the pel position of the character A in node 305 is 0%, as apparent from the address (1, 1) of FIG. 6. That is, the probability of white appearing in the pel position is 100%. Accordingly, the probability of recognizing the character A in the leaf node 316 is $28.5\% \times 100\% = 28.5\%$, while the probability of recognizing the character B is $40\% \times 0\% = 0\%$.

The probability of recognition of the leaf node is calculated in the following manner. The probability of black appearing in the pel (1, 1) of the character B is 100%, as apparent from the pel address (1, 1) of FIG. 7. Accordingly, the probability of recognizing the character B at leaf node 317 is $40\% \times 100\% = 40\%$, while the probability of recognizing the character A is $28.5\% \times 0\% = 0\%$. The probability values newly assigned to these nodes 316 and 317 are used in block 27 in FIG. 2A.

For purposes of simplifying this description, the size of the frame of the working buffer 4 is described as $9 \times 11$ pels, although the frame actually has $32 \times 40$ pels.

Although the description was directed to the learning operations of character recognition trees, i.e., the operations for modifying the trees, the invention could be used in an algorithm performing character recognition by sampling the characteristics of the characters and storing a characteristics list representing the characteristics for each character.

Although the recognition of alphanumeric character patterns and learning operations have been described, Japanese characters or finger patterns may be used in place of alphanumeric characters.

In the preferred embodiment, the correction of the erroneously recognized character code to the correct code was made for each character row, but the operations could be performed every plural character rows. Although the trees are modified after the completion of character recognition of one page of the document, the modification of trees could be made after plural pages of the document have been recognized.

EFFECTS OF INVENTION

The effects of the present inventions are that the time period for modifying the character recognition trees is short; the memory space used for the modification is small; the operator's intervention is minimized; the modification of the trees is performed during the character recognition operations; and the minimum number of samples for the learning and modifying operations is required.

We claim:

1. An apparatus for recognizing a pattern image having multiple picture elements, comprising:

a first memory for storing a pattern image;

pattern recognition means connected to said first memory for recognizing patterns in said pattern image according to a tree-based pattern recognition procedure including plural recognition steps;

said pattern recognition means including a decision tree having a root node and a plurality of branch and leaf nodes arranged in a root-to-leaf node configuration, wherein the root and branch nodes correspond to selected picture elements of the pattern image and the leaf nodes correspond to pattern codes, and further wherein a pattern code is determined to correspond to an input pattern image by following said decision tree in a root-to-leaf node direction in accordance with the color of each picture element associated with each node encountered in the decision tree;

a second memory connected to said pattern recognition means for storing a pattern image erroneously recognized by said pattern recognition procedure;

means for generating a first probability map including plural storage positions, each of which stores a value representing a probability of black appearing in a picture element of said erroneously recognized pattern image;

means for supplying said values as input data to said pattern recognition procedure and detecting one or more leaf nodes of said decision tree having a predetermined minimum probability of being assigned to the input pattern image during said pattern recognition procedure;

means for generating a second probability map including plural storage positions, each of which stores a value representing a probability of black appearing in a picture element of a pattern image corresponding to a pattern code assigned to one of said detected leaf nodes; and means for extending said decision tree from at lease one of said detected leaf nodes by comparing said first and second probability maps, identifying a picture element wherein the probability values of each probability map have a maximum difference, assigning that picture element to said detected leaf node, and extending said detected leaf node to a new pair of leaf nodes representing, respectively, a pattern code correctly corresponding to said erroneously recognized pattern image and the pattern code previously assigned to said detected leaf node.

2. An apparatus according to claim 1 wherein said pattern codes include character patterns.

3. An apparatus according to claim 2 wherein each root and branch node of said pattern recognition tree stores address data of a selected picture element of said pattern image.

4. An apparatus according to claim 1 wherein each of the picture elements of said pattern image is represented by a binary digit.

5. An apparatus according to claim 2 wherein said decision tree is stored in a tree memory together with character patterns and character codes.

6. An apparatus according to claim 1 further comprising:

an image buffer for storing character images of a document;

means for segmenting said images of characters of one character row into separate character images of each character; and means for storing said separate character images of one character row into said first memory.

7. An apparatus according to claim 6 wherein said first memory is a working buffer.

8. An apparatus according to claim 6, further comprising a resultant buffer, wherein said second memory is a learning buffer, and wherein said pattern recognition means include means for recognizing said separate character images of said one character row, storing the results of said recognition in said resultant buffer, and storing erroneously recognized character images and corresponding character codes in said learning buffer.

9. An apparatus according to claim 8 wherein said means for generating a first probability map further comprises means for fetching an erroneously recognized character image stored in said learning buffer and means for determining values representing a probability of black appearing in picture elements of said erroneously recognized character image.

10. An apparatus according to claim 9 wherein said fetching and determining means:

sequentially scans each picture element and its neighboring picture elements of said erroneously recognized character image, and for each scanned picture element;

accesses an entry of a statistic table by using a pattern of said neighboring picture elements as an address;

fetches a value stored in said entry, which represents a probability of black appearing in said picture element; and stores said fetched value into a stored location of said first probability map corresponding to the position of said picture element.

11. An apparatus according to claim 2 wherein said means for generating a second probability map fetches from a memory space a character image of a character code assigned to a selected one of said detected leaf nodes.

12. A character recognition apparatus for recognizing images of characters of a document comprising:

storage means for storing character images of said document, said character images having multiple picture elements;

character recognition means connected to said storage means including character recognition trees for recognizing said character images and generating corresponding character codes;

resultant buffer means connected to said character recognition means for storing character codes of characters recognized with high probability, and storing character codes and associated character images recognized with low probability;

means for correcting said character codes recognized with low probability to corrected character codes;

a learning buffer for storing said corrected character codes and associated character images recognized with low probability;

means for forming a first probability map which stores first values of a probability of black appearing in each picture element of said character images in said learning buffer;

means for supplying said first probability values to said character recognition trees to detect leaf nodes which recognized said character images in said learning buffer;

means for forming a second probability map which stores second values of a probability of black appearing in each picture element of character images of the character codes assigned to said detected leaf nodes;

means for comparing the first values in said first probability map with the second values in said probability map to detect picture elements at which the probability value of one of said maps is high and the probability of the other said map is low; and means for replacing said character codes of said detected leaf nodes by addresses corresponding to said detected picture elements, extending two nodes from said detected leaf nodes, assigning to some of said extended nodes the said character codes originally assigned to said detected leaf nodes, and assigning to other of said extended leaf nodes the character codes in said learning buffer.

13. An apparatus for recognizing a pattern image representing a single character having one or more picture elements, comprising:

pattern recognition means including a decision tree for inputting and recognizing a pattern image to generate a corresponding pattern code output;

pattern identification means for identifying an erroneous pattern code generated by said pattern recognition means corresponding to an erroneously recognized pattern image;

correction means for modifying said pattern recognition means to correctly recognize said erroneously recognized pattern image, said correction means including probability means for scanning neighborhoods of picture elements in said erroneously recognized pattern image and generating a probability map including at least three different values representing a range of probability values for modifying the pattern code output of said pattern recognition means to generate a corrected pattern code corresponding to said erroneously recognized pattern image following input of said pattern image to said pattern recognition means.

14. An apparatus for recognizing a pattern image having one or more picture elements, comprising:

pattern recognition means including a decision tree for inputting and recognizing a pattern image to generate a corresponding pattern code output;

pattern identification means for identifying an erroneous pattern code generated by said pattern recognition means corresponding to an erroneously recognized pattern image;

correction means for modifying said pattern recognition means to correctly recognize said erroneously recognized pattern image, said correction means including probability means for generating a probability map for modifying the pattern code output of said pattern recognition means to generate a corrected pattern code corresponding to said erroneously recognized pattern image following input of said pattern image to said pattern recognition means, said correction means including a first probability map corresponding to said erroneously recognized pattern image and a second probability map corresponding to a pattern image representing said erroneous pattern code, and wherein said pattern recognition apparatus further includes comparison means for identifying a point of difference between said first and second probability maps and for modifying said pattern recognition means to generate said corrected pattern code based on said point of difference.

15. The pattern recognition apparatus of claim 14 wherein said point of difference between said first and second probability maps is a difference between a first value representing a probability of a selected color occurring in a picture element of said erroneously recognized pattern image and a second value representing a probability of the selected color occurring in the same picture element of said pattern image corresponding to said erroneous pattern code.

16. A method for recognizing a pattern image representing a single character having multiple picture elements, comprising the steps of:

inputting a pattern image and recognizing the pattern image using pattern recognition means including a decision tree for generating a corresponding pattern code output;

identifying an erroneous pattern code generated by said pattern recognition means corresponding to an erroneously recognized pattern image; and modifying said pattern recognition means to correctly recognize said erroneously recognized pattern image by scanning neighborhoods of picture elements in said erroneously recognized pattern image and in a pattern image corresponding to said erroneous pattern code to generate probability maps including at least three different values representing a range of probability values for modifying the pattern code output of said pattern recognition means to generate a corrected pattern code corresponding to said erroneously recognized pattern image following input of said pattern image to said pattern recognition means.

17. A method for recognizing a pattern image having multiple picture elements, comprising the steps of:

inputting a pattern image and recognizing the pattern image using pattern recognition means including a decision tree for generating a corresponding pattern code output;

identifying an erroneous pattern code generated by said pattern recognition means corresponding to an erroneously recognized pattern image; and modifying said pattern recognition means to correctly recognize said erroneously recognized pattern image using probability maps for modifying the pattern code output of said pattern recognition means to generate a corrected pattern code corresponding to said erroneously recognized pattern image following input of said pattern image to said pattern recognition means, said modifying step including the step of identifying a point of difference between a probability map corresponding to said erroneously recognized pattern image and a probability map corresponding to a pattern image of said erroneous pattern code and modifying said pattern recognition means to correctly generate said corrected pattern code based on said point of difference.

18. The pattern recognition method of claim 17, wherein said point of difference is the difference between the first value representing a probability of a selected color occurring in a picture element of said erroneously recognized pattern image and a second value representing a probability of the selected color occurring in the same picture element in said pattern image corresponding to said erroneous pattern code.

19. A method for adaptively assigning codes to each one of a set of input PEL array patterns in a system formed from a scanner for optically scanning patterns of images or characters on a document and generating input array patterns, a memory for storing programs and data including a library of at least one pattern, output means, and a processor intercoupling the scanner, memory and output means, in response to the programs for operating upon the data, comprising the steps of:

classifying an input pattern provided by the scanner according to one of the patterns in the library using color values in the input pattern at each location specified by a decision tree node in order to determine a successor node in a route-to-leaf node direction until terminating in a code designating a library pattern;

comparing the code with the input; and either upon a match, storing the code in the output means and processing the next input pattern; or upon a mismatch, generating a new code, adding the input pattern to the library in the memory, and extending the decision tree from the leaf node corresponding to the code by scanning neighborhoods of PELs in the input pattern to generate a probability map of the input pattern including at least three different values representing a range of probability values; and processing the next input pattern.

20. A method for adaptively assigning codes to successive PEL input patterns to a decision tree, the tree leaf nodes being in concordance with codes and in respect to second and subsequent input patterns in a system formed from a scanner for optically scanning patterns of images or characters on a document and generating input array pattern, a memory for storing programs and data including a library of at least one pattern, output means, a display and a processor intercoupling the scanner, memory, output means and display in response to the program for operating upon the data, comprising the steps of:

classifying a pattern provided by the scanner as a code corresponding to one of the library patterns by reiteratively using the color value of each PEL whose input array location is specified by a decision tree node to branch to a successor node in a root-to-leaf node direction until a leaf node is encountered;

verifying the classification by inputting the code to the display for comparison to the input pattern; and either storing the code in the output means upon the comparison being within a matching correlation and processing the next input pattern; or generating a new code, adding the pattern to the library in the memory, and extending the leaf node of the decision tree using probability maps corresponding to the input pattern and said one of the library patterns to determine a PEL location wherein the corresponding probability values of said probability maps are high and low, respectively, and assigning that PEL location to said decision tree leaf node.

21. A method according to claim 20 wherein the PEL location is one wherein the difference in probability map values for the input pattern and said one of the library patterns is a maximum.

* * * * *

UNITED STATES PATENT AND TRADEMARK OFFICE
CERTIFICATE OF CORRECTION

PATENT NO. : 5,394,484
DATED : February 28, 1995
INVENTOR(S) : Casey et al

It is certified that error appears in the above-indentified patent and that said Letters Patent is hereby corrected as shown below:

Column 13, line 53, change "lease" to --least--.

Column 15, line 28, delete the second occurrence of "said".

Signed and Sealed this

Twelfth Day of November, 1996

Attest:

BRUCE LEHMAN

Attesting Officer

Commissioner of Patents and Trademarks